(12) United States Patent
Malloy

(10) Patent No.: US 7,267,474 B2
(45) Date of Patent: Sep. 11, 2007

(54) PLASTICATING SCREW

(76) Inventor: Robert Malloy, 13 King Charles Dr., Londonderry, NH (US) 03053

( * ) Notice: Subject to any disclaimer, the term of this patent is extended or adjusted under 35 U.S.C. 154(b) by 0 days.

(21) Appl. No.: 11/244,819

(22) Filed: Oct. 6, 2005

(65) Prior Publication Data

US 2006/0181958 A1    Aug. 17, 2006

Related U.S. Application Data

(63) Continuation of application No. 10/408,980, filed on Apr. 8, 2003, now Pat. No. 7,021,816.

(60) Provisional application No. 60/370,781, filed on Apr. 8, 2002.

(51) Int. Cl.
    *B29B 7/42*    (2006.01)

(52) U.S. Cl. .......................................... 366/81; 366/82

(58) Field of Classification Search ................. 366/81, 366/88, 89, 90, 82, 79; 425/208, 209
See application file for complete search history.

(56) References Cited

U.S. PATENT DOCUMENTS

| | | | | |
|---|---|---|---|---|
| 840,107 A | 1/1907 | Brittain | .................... | 366/90 |
| 2,680,879 A | 6/1954 | Schnuck et al. | ............... | 366/90 |
| 3,006,029 A | 10/1961 | Saxton | .................... | 366/90 |
| 3,239,882 A | 3/1966 | Yokana | .................... | 366/82 |
| 3,486,192 A | 12/1969 | Le Roy | .................... | 366/82 |
| 3,524,222 A | 8/1970 | Street et al. | ................. | 425/208 |
| 3,652,064 A | 3/1972 | Lehnen et al. | ................. | 366/88 |
| 3,941,533 A | 3/1976 | Gillespie | .................... | 425/143 |
| 3,941,535 A | 3/1976 | Street | .................... | 425/208 |
| 4,085,461 A | 4/1978 | Maillefer | .................... | 366/90 |
| 4,321,229 A | 3/1982 | Blakeslee | .................... | 264/349 |
| 4,981,364 A | 1/1991 | Geyer | .................... | 366/81 |
| 5,215,764 A | 6/1993 | Davis et al. | ................. | 366/90 |

(Continued)

FOREIGN PATENT DOCUMENTS

DE          3533225    *  5/1986    ................ 366/79

(Continued)

OTHER PUBLICATIONS

"Recycling of Commingled Plastic Waste Using Built-In Compatibilizing Agents: A Mixed Plastic Waste Recycling Concept"; by R. Malloy, M. Condo and K. Boudreau; University of Mass-Lowell, Dept. of Plastics Engineering, Lowell, Mass. 01854, no date, 16 pages.

(Continued)

*Primary Examiner*—Tony G. Soohoo
(74) *Attorney, Agent, or Firm*—Grossman, Tucker, Perreault & Pfleger, PLLC

(57) ABSTRACT

A plasticating screw including a grating mixing section provided to enhance mixing of incompatible materials. The screw includes a mixing section including an inlet groove having a closed distal end, a discharge groove circumferentially spaced from the inlet groove, the discharge groove having a closed proximal end. Located between the inlet groove and the discharge groove is a land region is including at least one grating element that includes a plurality of grooves extending between the inlet groove and the discharge groove.

9 Claims, 4 Drawing Sheets

U.S. PATENT DOCUMENTS

| | | | |
|---|---|---|---|
| 5,318,358 A | 6/1994 | Wobbe et al. | 366/85 |
| 5,356,281 A | 10/1994 | Katsuno et al. | 425/208 |
| 5,443,772 A | 8/1995 | Inoue et al. | 264/102 |
| 5,551,777 A | 9/1996 | Tjahjadi et al. | 366/100 |
| 5,719,198 A | 2/1998 | Young et al. | 521/40.5 |
| 5,783,226 A | 7/1998 | Chi | 425/205 |
| 5,851,065 A | 12/1998 | Ikeda et al. | 366/76.6 |
| 6,217,804 B1 | 4/2001 | Lieberman | 264/102 |
| 6,488,399 B1 | 12/2002 | Womer et al. | 366/81 |
| 6,497,508 B1 | 12/2002 | Womer et al. | 366/81 |
| 7,021,816 B2 * | 4/2006 | Malloy | 366/81 |

FOREIGN PATENT DOCUMENTS

| | | | |
|---|---|---|---|
| EP | 0078453 | * 10/1982 | 366/79 |
| JP | 43-24493 | * 10/1968 | |
| JP | 56-42035 | * 10/1981 | |
| JP | 59-67028 | * 4/1984 | |
| JP | 59-103732 | * 6/1984 | 366/79 |
| JP | 60049907 A | * 3/1985 | |
| JP | 61086215 A | * 5/1986 | |
| JP | 63-32603 | * 6/1988 | |
| JP | 63-56048 | * 11/1988 | |

OTHER PUBLICATIONS

"Recycled HDPE/PP Blends: Effect of Plasticating Screw Type on Blend Performance"; By R.A. Malloy, Dept. of Plastics Engineering, University of Mass @ Lowell, Lowell, MA and C.B. Thorne, Polyfil Additives Technology, Dover, N.J.; ANTEC '97 Conference; vol. III-Special Areas 1997; pp. 3098-3101.

"Melt Filtration, Characterization, Product Selection and Design From Painted/Plated Recycled Computer Casings"; By P. Borkar and F. Lai, Plastics Engineering, University of Mass., Lowell, MA.; ANTEC '93, pp. 877-881, date 1993.

"An Improved Mixing-Screw Design"; By Bruce H. Maddock, Plastics Div., Union Carbide Corp., Bound Brook, N.J. SPE Journal, Jul. 1967; Extrusion; pp. 23-29.

"Polymer Extrusion"; by Chris Rauwendaal SPE Journal, Second Journal, Second Reprint 1990; 8 Extruder Screw Design; p. 416, date 1990.

"Union Carbide Mixer"; Spirex, Plasticating Components 2000, p. 12, date 2000.

"A Reprocessing Study For Reground Painted Thermoplastic Olefin"; MS Thesis by Anthony Filip, B.S. University of Mass. Lowell (2000), 68 pages, 2002.

* cited by examiner

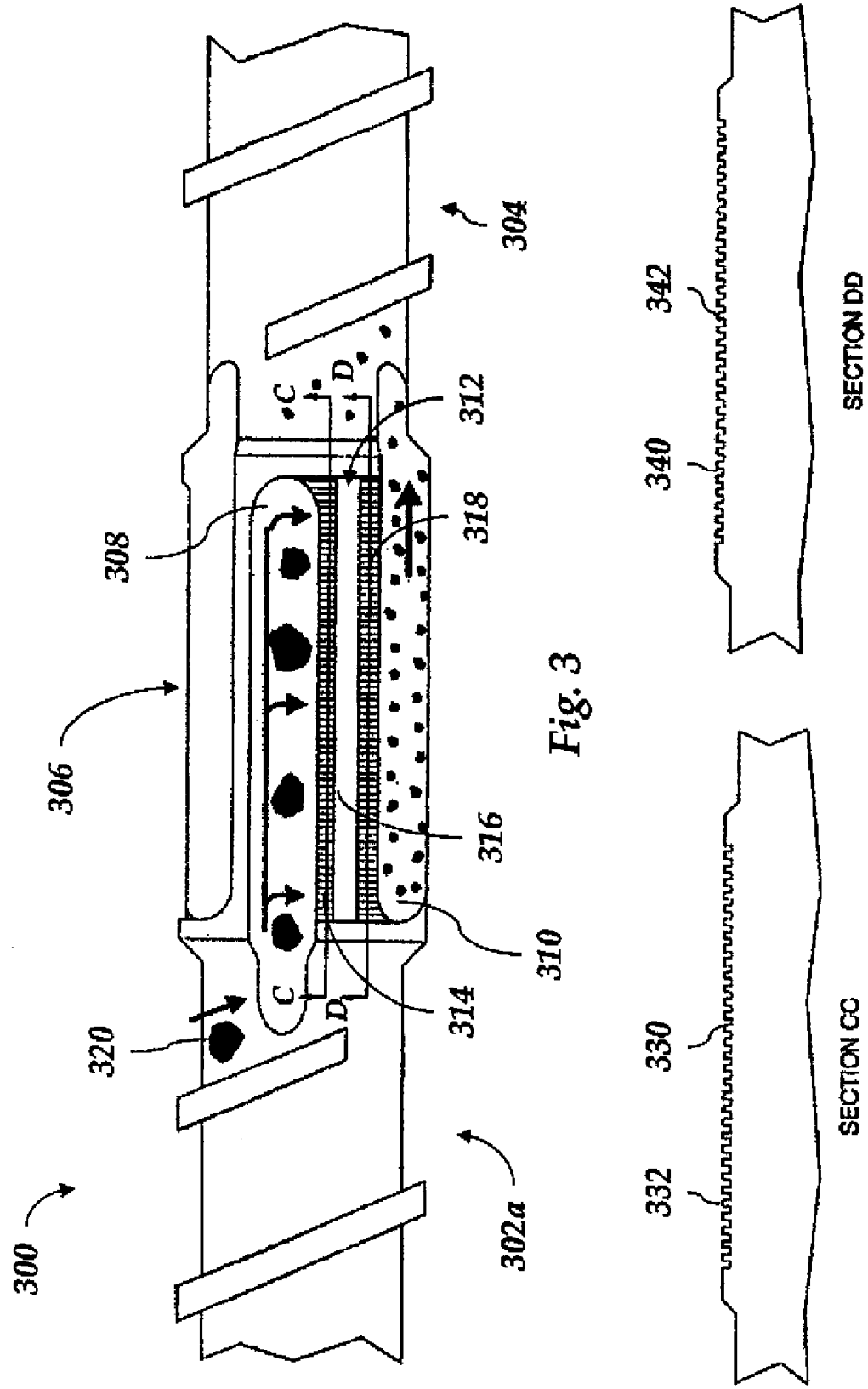

PLASTICATING SCREW

CROSS-REFERENCE TO RELATED APPLICATIONS

This application is a continuation of U.S. patent application Ser. No. 10/408,980 filed Apr. 8, 2003 now U.S. Pat. No. 7,021,816 which claims the benefit of U.S. provisional patent application Ser. No. 60/370,781, filed on Apr. 8, 2002, the entire disclosure of which is incorporated by reference.

FIELD OF THE INVENTION

The present invention is directed as a plasticating screw, and more particularly at a plasticating screw configured to reduce the size of contaminants through melt processing.

BACKGROUND OF THE INVENTION

Thermoplastic materials are used to manufacture items that range from food packages to automotive body panels. In many cases, particularly in cases where superior product performance or appearance is required, multi-layer or multi-material constructions are utilized. Such applications could include: painted plastic parts, plastic packages with barrier coatings, clear coated plastic parts, co-extruded or co-molded items, multi-shot molded parts, and in-mold paint film applications.

In each of the cases listed above, the presence of the multi-material structure creates problems with respect to the mechanical "recyclability" the materials. The other material layers will often act as incompatible contamination, and have a generally negative impact on the recyclability of the primary thermoplastic material. For example, most of the paints or coatings used to paint plastic parts are thermosetting in nature and act as solid particulate inclusions in the recycled matrix material. Ideally, recovered materials are fully separated or segregated prior to recycling. This provides the highest value recycle stream(s).

Methods for removing coatings from coated plastic parts have been developed, but are not always cost effective. Similarly, separating multi-material or multi-layer structures may or may not be technically feasible depending on their specific construction. However, the cost of segregating multi-material structures can often be more than economics justify. In other cases, such as in the case of a complex automotive carpet structure, separation of the individual plastic constituents that make up the structure is not technically feasible. In such cases, the multi-material formulation is most easily reused as a commingled stream. In some cases, additional materials or compatibilizing agents are used to enhance the physical properties and/or processability of the commingled feed. As an alternative, these complex material constructions can sometimes be effectively recycled if the contaminating layers can be reduced in particle size and effectively mixed into the continuous thermoplastic matrix material.

Studies have shown that the "degree of mixing" is an extremely important variable when reprocessing commingled plastic materials or a contaminated plastic formulation. The same exact material composition can exhibit very different physical properties if it is melt processed at different temperatures or with a different mixing history (or degree of mixing). Mixing during compounding and/or reprocessing are both important. The specific nature of the materials involved will determine whether distributive or dispersive mixing (or both) is most important.

An example of a multi-layer plastic item is a painted thermoplastic automotive body panel, such as a thermoplastic polyolefin bumper coated with a primer/paint system. In-plant (post industrial) recycling is important for painted parts that are rejected for quality reasons, however post consumer recycling of painted plastic automobile body panels becomes more important by the day. If a painted or coated thermoplastic product is simply granulated and extruded (or injection molded) into a new, second generation plastic item, the end product will likely exhibit inferior mechanical properties and surface finish. Most paints or coatings used in such applications are thermosetting in nature, and do not re-melt when the substrate thermoplastic material is reprocessed. The un-melted paint flakes can act as contamination in the recycled plastic matrix, resulting in mechanical property-and surface finish quality problems.

There are a variety of ways to deal with the problems associated with reprocessing of painted or coated reground plastic. It is possible to remove the coatings from the plastic granules by methods such as chemical attack, differential thermal expansion, abrasion, etc. However, all of these techniques involve additional processes, handling, equipment and significant cost. Other methods of paint removal involve chemical degradation of the paint film and removal of the volatile degradation products. Melt filtration has also been used to remove coatings. Many other paint removal methods have been developed using other concepts such as chemical stripping, autoclave treatment, differential thermal expansion and pulverization.

One possible alternative to the decontamination techniques described above is to reuse the contaminated plastic without removing the paint coating or other non-melting contaminate. Eliminating the pre-processing paint removal steps would reduce the overall reprocessing costs during recycling, but unfortunately these cost reductions are at the expense of material performance or quality. However, there are a number of secondary recycling applications where the physical properties of the contaminated material may still be adequate for the application. One factor that is known to be important for contaminated plastics is the physical "size" and "shape" of the contaminating particles. Generally, a smaller particle, with more uniform particle size distribution, results in a more homogeneous material. Particle size reduction for solid contaminates can be achieved through granulation, or through some type of melt mixing action. Molded plastic parts normally have a wall thickness in the 1.0 mm to 3.0 mm range. A typical granulator used for granulating painted plastic parts uses a 10 mm diameter discharge screen. The granules (and paint coating) discharged from the granulator can have length and width dimensions as large as this screen hole diameter. Therefore, size of the paint flakes (i.e. their width and length) associated with granulated plastics are typically greater than the thickness of a typical molded plastic part. It is expected that the surface appearance of molded parts produced from reground painted plastics would be improved if the contaminating flakes have a smaller physical size. Smaller size contamination will also cause fewer problems if the contaminated melt flows through thin wall sections or small orifices (such as a hot runner gate). The physical size of the paint flake contamination can be reduced by regrinding the painted parts with a granulator having a smaller discharge screen diameter. However, this approach presents problems with both granulator throughput rates, and possible material handling difficulties (fines and powder).

SUMMARY OF THE INVENTION

A plasticating screw consistent with the present invention includes a flighted region at a proximal of the screw and a mixing section adjacent a distal end of the screw. The mixing section includes an inlet groove having a closed distal end and a discharge groove having a closed proximal end, with the discharge groove being circumferentially spaced from the inlet groove. The region between the inlet groove and the discharge groove is a land region having at least one grating element including a plurality of grooves extending between the inlet groove and the discharge groove.

A mixing section for a plasticating screw is provided including an inlet groove having a closed distal end and a discharge groove circumferentially spaced from the inlet groove, the discharge groove having a closed proximal end. Located between the inlet groove and the discharge groove is a land region including at least one grating element comprising a plurality of grooves extending between said inlet groove and said discharge groove.

The present invention also provides a method for mixing a primary thermoplastic material with a second material including providing an extruder having a screw comprising a mixing section including an inlet groove and a discharge groove having disposed therebetween at least one grating element including a plurality of grooves extending between said inlet groove and said discharge groove, providing a combination of said primary material and said second material to said extruding, and melt extruding the combination of said primary material and said second material using said extruder, whereby a domain size of said second material is reduced after melt extruding.

BRIEF DESCRIPTION OF THE DRAWINGS

Features and advantages of the present invention are described in the following detailed description of exemplary embodiments, which description should be understood in conjunction with the accompanying drawings wherein:

FIG. 3 illustrates a portion of an exemplary plasticating screw having a mixing section consistent with a second embodiment of the present invention;

FIGS. 4a and 4b, respectively, are cross-sectional views of the first and second grating land elements of the mixing section illustrated in FIG. 3;

DETAILED DESCRIPTION OF EXEMPLARY EMBODIMENT

The present invention relates to plasticating screw and a mixing section for a plasticating screw that may advantageously reduce the domain size of secondary material in a primary material matrix. Consistent with the present invention, the secondary material is a material that may form discrete domains within the primary material matrix. Accordingly, the secondary material may include thermoplastic materials that are not compatible with the primary material, materials solid or gel material, for example thermoset materials, or thermoplastic materials having a higher melting point than the primary material. The secondary material may also include various other polymeric and non-polymeric materials that do not readily mix with the primary material.

Figure 1:
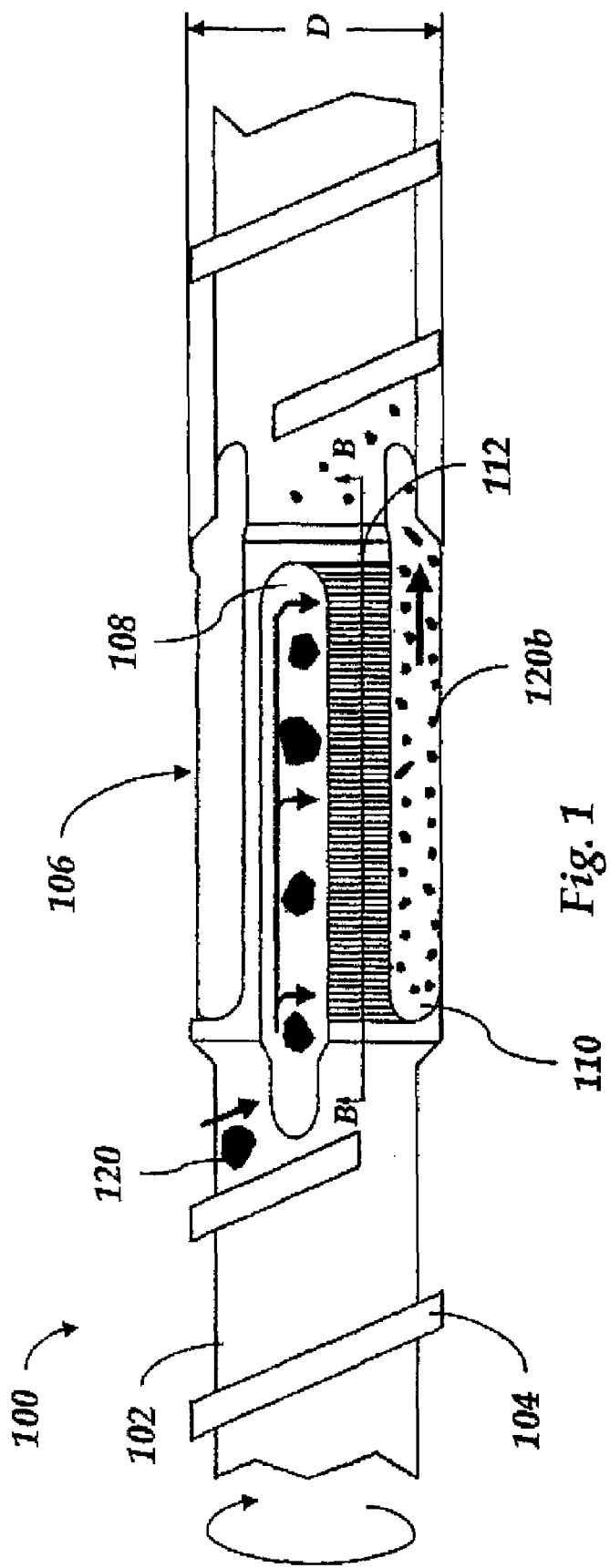
FIG. 1 illustrates a portion of an exemplary plasticating screw having a mixing section consistent with a first embodiment of the present invention.

Referring to FIG. 1, a portion of a plasticating screw 100 consistent with a first exemplary embodiment is shown. The plasticating screw 100 may generally be of the variety used in single screw extrusion of thermoplastic materials and the like. The screw 100 may include a root 102 having at least one flight 104 helically wound there-around for conveying and shearing the thermoplastic material. Additionally, the screw 100 includes a mixing section 106.

The mixing section 106 generally includes a region having an enlarged diameter D that may generally correspond to the diameter of the flight 104. The mixing section 106 further includes a plurality of corresponding, adjacent inlet grooves 108 and discharge grooves 110. The inlet grooves 108 are configured accept a flow of material from the feed zone of the extruder. However, the inlet grooves 108 are closed at the distal end, preventing axial transfer of material therefrom. In a corresponding manner, the discharge grooves 110 have a closed proximal end and an open distal end thereby permitting axial transfer of material from the discharge groove 110 toward the nozzle of the extruder. The inlet groove 108 and discharge groove 110 may each be generally axially aligned with the screw 100. Alternatively, the inlet groove 108 and discharge groove 110 may be angled relative to the axis of the screw 100.

Figure 2:
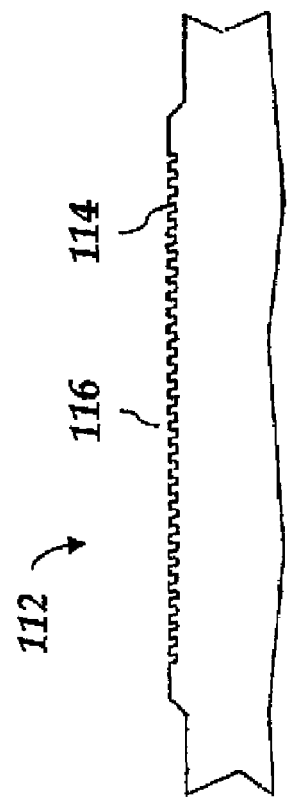
FIG. 2 is a cross-sectional view of the grating or land portion of the exemplary mixing section illustrated in FIG. 1.

The inlet grooves 108 and discharge grooves 110 are separated by a grating land element 112. Referring to FIG. 2, a cross-sectional view of the land 112 is shown including a plurality of openings 114 and teeth 116 oriented generally perpendicular to the axis if the inlet grooves 108 and discharge grooves 110. According to a first exemplary embodiment, the openings may have a width in the range of about 0.002 to 0.200 inches and a depth in the range of about 0.002 to 0.060 inches.

In FIG. 1 the anticipated movement of material through the mixing section is indicated by bold arrows. As shown, when the screw is operated rotating in a clockwise direction as viewed from the nozzle of the extruder material will be conveyed along the screw 100 to the mixing section 106. The material will enter the inlet grooves 108 and be smeared across the land 112 into the discharge groove 110. From the discharge groove 110 the material may be further transferred to the nozzle of the extruder. In addition to "smearing" material across the land 112, the teeth 114 inflict a grating mechanism on the material.

In the presence of a second material making up discrete domains, the grating mechanism of the land 112 may reduce the domain size of the second material as well as improve mixing of the materials being extruded. In the exemplary embodiment depicted in FIG. 1, the second material 120 generally travels through the extruder carried by the primary material. As illustrated, the second material 120 passes into the inlet grooves 108 and then is transferred across the grating land elements 112 to the discharge grooves 110. As shown, transferring the second material 120 across the land elements 112 acts to reduce the domain sized of the second material 120b. The reduced size second material 120b is discharged from the discharge groove 110 towards the nozzle of the extruder.

It should be appreciated that the effects of the grating action of the land 112 are applicable to particulate, gel, molten, and semi-molten materials, as well as combinations thereof. Additionally, the plasticating screw herein is suitable for use with mixtures of materials including more than two components.

Turning to FIG. 3 a portion of a second exemplary plasticating screw 300 is shown having the same general configuration as the first exemplary screw. Similar to the first embodiment the screw 300 includes a mixing section 306 disposed between two flighted regions 302 and 304 of the screw. The mixing section 306 includes adjacent pairs of inlet grooves 308 and discharge grooves 310. Each associated inlet groove 308 and discharge groove 310 is separated by a land element 312, generally.

The land element 312 of the second embodiment include three elements: a first grating element 314 adjacent to the inlet groove 308, a second grating element 318 adjacent the discharge groove 310 and a closed-ended separating channel or groove 316 disposed between the first and second grating elements 314, 318.

Referring to FIGS. 4a and 4b, the first and second grating elements 314, 318 may include similarly spaced groove/teeth arrangements 330/332 and 340/342 respectively. In this manner, the second mixing section 306 is generally the same as the first mixing section 106, only having a groove or channel in the approximate middle of the land. Alternatively, the groove/teeth of the respective first and second grating elements 314, 318 may be offset such that any groove 330 in the first grating element 314 is aligned with a tooth 342 of the second grating element 318.

In operation, a second material 320 carried by a primary material traveling through the mixing section 306 enters the inlet groove 308 and is transferred across the first grating element 314 and into the separating channel 316. The second material 320 is then transferred from the separating channel 316 to across the second grating element 318 to the discharge groove 310. Being passed across the grating elements reduces the domain sizes of the second material and improves dispersion/distribution of the second material in the primary material. The two grating elements 314, 318 provide two grating cycles to every domain of the second material 320 conveyed by the screw 300, which provides a narrower domain size distribution of the second material.

Figure 5:
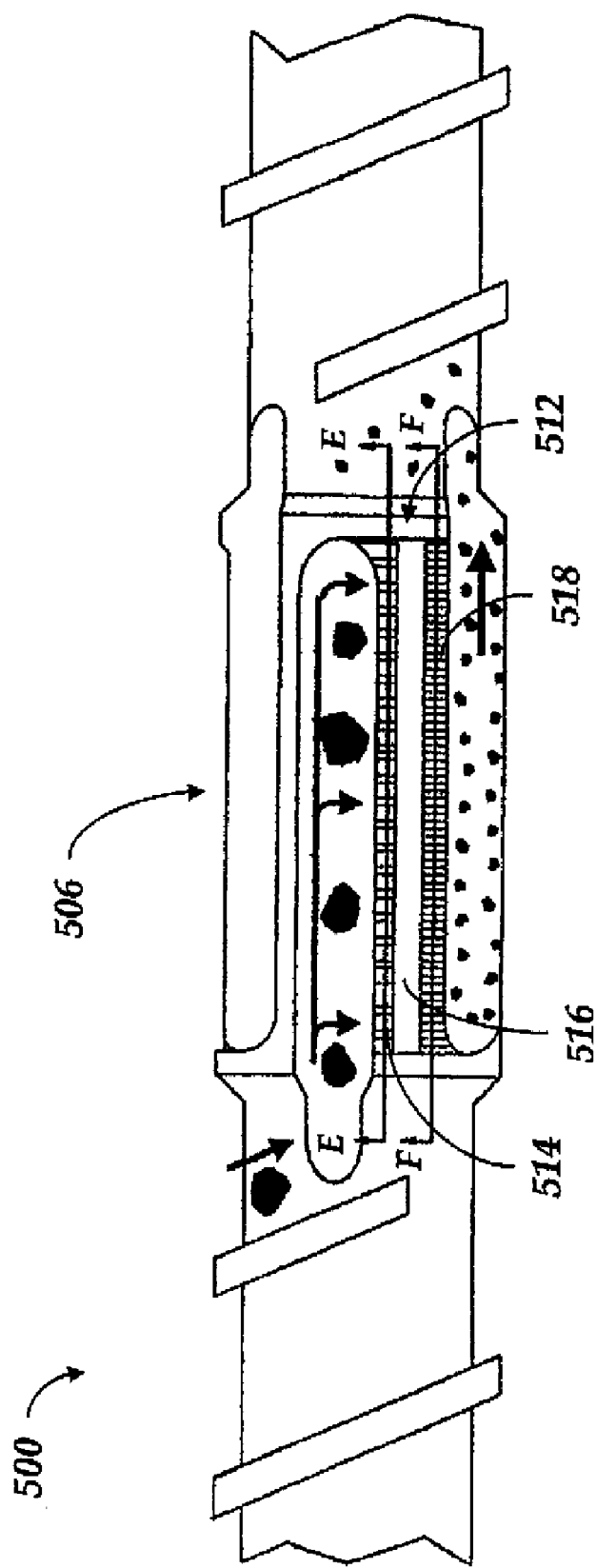
FIG. 5 illustrates a portion of an exemplary plasticating screw including a mixing section consistent with a third embodiment of the present invention.
Figure 6A:
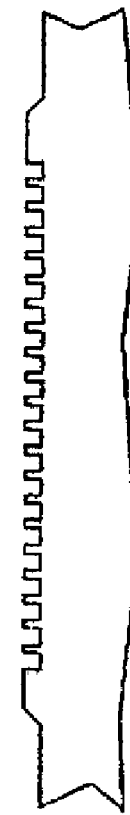
FIGS. 6a and 6b, respectively, are cross-sectional views of the first and second grating land elements of the third exemplary mixing section illustrated in FIG. 5.
Figure 6B:
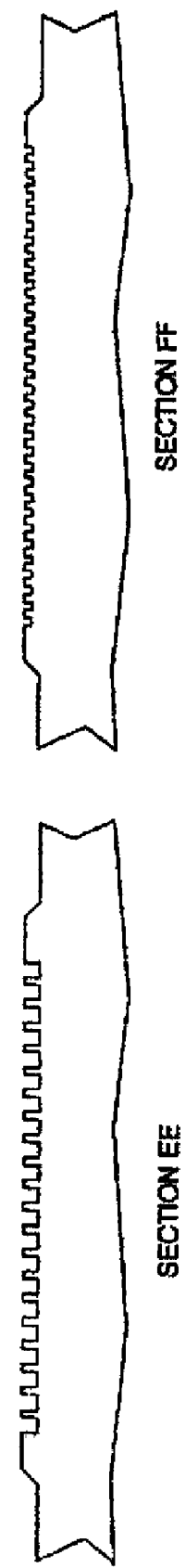

FIG. 5 illustrates a third exemplary plasticating screw 500 consistent with the present invention including a mixing section 506. The mixing section 506 includes pairs of adjacent inlet grooves 508 and 510 separated by a land region 512, generally. As with the previous embodiment, the land 515 includes two grating elements 514, 518 separated by a channel or groove 516. Differing from the previous embodiment, however, the second grating element 518 of this embodiment is finer than the first grating element 514. This aspect is illustrated in FIGS. 6a and 6b which show cross-sections of the first and the second grating elements 514, 518 respectively. As shown in FIGS. 6a and 6b, the grating of the second element 518 may be finer than the first element 514 both in the width and depth of the grating. Alternatively, it may be desirable to reduce only one aspect of the grating, i.e. only either the width of the depth.

It should be appreciated that the land region between each associated inlet groove and discharge groove may be divided into any number of grating elements, which grating elements may be programmed with any variety of profiles. That is, the several grating elements may be of the same dimensions, or may be of decreasing or increasing coarseness or combinations thereof.

Additionally, it should be understood that the design and configuration of the flighted sections of the plasticating screw are largely irrelevant to the present invention. The mixing section may be equally suitable for use with single flighted and multi-flighted screws having constant or variable pitch, etc. Additionally, while it may be advantageous to locate the mixing section in the transition or metering sections of the screw, the exact location of the mixing section may be adjusted to suit individual applications without departing from the invention herein.

At the time of filing, it is believed that the effectiveness of the grating mixer according to the present invention is most likely associated with the entrance region(s) of the grating rows. The experimental studies with this grating concept have shown that two short land grating rows are significantly more effective than one longer land grating row of the same cross section. Additional benefits would be expected if additional rows, especially offset rows, were added. However, appreciable advantages in contaminant size reduction may be realized from a mixing section including only one grating element per inlet/discharge pair.

EXPERIMENTAL EXAMPLES

The degree of paint flake size reduction during extrusion provided by a plasticating screw having a mixing section consistent with the present invention was comparatively evaluated against a conventional square pitch screw without a mixing section and a plasticating screw having a conventional UC mixing section, in each case using a 38 mm diameter 24 L/D Welex single screw, having an 8.0 mm deep feed section and interchangeable 7 L/D removable discharge end.

For the experimental evaluation, the interchangeable discharge end of the screw was alternatively configured to have a 3.2 mm deep metering section (the conventional or general purpose screw), a 2 L/D UC (LeRoy mixing section screw) mixing section followed by a 3 turn metering section, and a 2 L/D double grating element mixing section consistent with the present invention. The UC mixing section was provided having three 0.50 mm deep×9.6 mm long×2 L/D wide shear lands. The grated mixing element according to the present invention was provided having three, double grating element land regions located at the same axial position along the screw, but 120° apart from one another. Each land region had two rows of grating elements, one at the inlet, and one at the discharge of the shear zone. Each grating element had 36 narrow, shallow openings, with the width and depth of each grating slot (for the screw section evaluated in this study) are 0.81 mm and 1.5 mm respectively.

The material utilized in comparative evaluation was reground, painted thermoplastic olefin (TPO) automobile bumpers. The TPO itself had a black color, and was coated with a thermoset paint (of various colors, on one side of the granules). The base TPO resin used for these auto bumpers was a Solvay Sequel® 1440. Virgin (unpainted) TPO of the same grade was also utilized in this study as a control. The virgin TPO had a melt flow rate of 8.3 g/10 min @ 190° C., 2.16 Kg (as measured experimentally). The granulated material was produced from parts having an average wall thickness in the range of 2.5 mm. A sieve analysis was conducted on the granulated material after removing a small percentage of very large shreds. It should be appreciated that such a sieve analysis on granulated parts will generally indicate the narrower of the x-y dimensions; found to be 4.6 mm as received.

Experiment 1

With each of the three screw configurations, the screws were used to plasticate the melt at a screw speed of 80 RPM, and barrel temperatures set from 210° C. (feed) to 224° C. (discharge). In the first experimental evaluation, the extruder was operated under "open discharge conditions", i.e., without a screen pack breaker plate, or die. The same process conditions were used for all trials. Output, melt temperature (via hand held TC) and drive variables were recorded for each trial. In addition, golf ball size samples of the molten extrudate obtained with each screw configuration were placed in a heated compression press located next to the extruder. The melt was compressed into very thin films having a thickness of 0.10 mm and cooled. The size and size distribution of the paint flakes where evaluated by making a transparency from scanned images of the films, and projecting an image of the films onto large paper screens using a high magnification projector. The longest dimension of each paint particle (projected) image was measured and marked with a pen in order to avoid double counting. These measurements were related to the actual dimension of the paint flake using a calibration based on the magnification of the projector. The average size and size range of the measured paint flakes based on the flake's long dimension measurements is reported in Table 1 below.

Experiment 2

In a second comparative evaluation, the same three screw configurations from Experiment 1 were used to extrude the painted TPO regrind at the same conditions as in Experiment 1. In Experiment 2 a pelletizing (strand) die was added to the extruder, however, again no breaker plate or screens were used (only an open seal ring was used). Pressed films having a thickness of 0.10 mm were produced for paint flake size analysis, as in Experiment 1. Additionally, quantities of pelletized material were produced for subsequent injection molding. The pelletized materials were injection molded using a 110 Ton Milacron Electra (all electric) injection molding machine into standard ASTM test specimens having a thickness of 3.2 mm. The injection molded test specimens tested to determine if the paint flake size distribution had any affect on the contaminated material's (or molded part) physical properties and appearance. While some additional paint flake size reduction would likely occur during pelletization and molding, the molding conditions were manipulated to minimize any additional process related damage. Specifically, a general purpose injection molding screw with a large diameter nozzle tip, and wide, full thickness gates were used. The injection molding conditions were also kept as constant as possible for all trials in an effort to "zero out" the additional paint flake damage. The virgin TPO pellets were also extruded, re-pelletized, and molded as a control for this study.

Experiment 3

Experiment 3 also used the same three screw configurations and extruder and conditions as the previous two experiments. In Experiment 3 both a breaker plate/screen pack (20-40-60-100-20 screens) and a pelletizing (strand) die were used. This experiment was performed to evaluate the influence of screens on paint flake size distribution and concentration in the melt, as well as molded part quality. 0.10 mm thick films were prepared for paint flake size analysis, as in the preceding experiments, and quantities of pelletized material were produced for subsequent injection molding. These "melt filtered" pelletized materials were injection molded using the same equipment and procedure described in Experiment 2 above. Once again, the injection molding conditions were kept constant for all trials in an effort to zero out any additional paint flake damage.

Experimental Results

Figure 7:
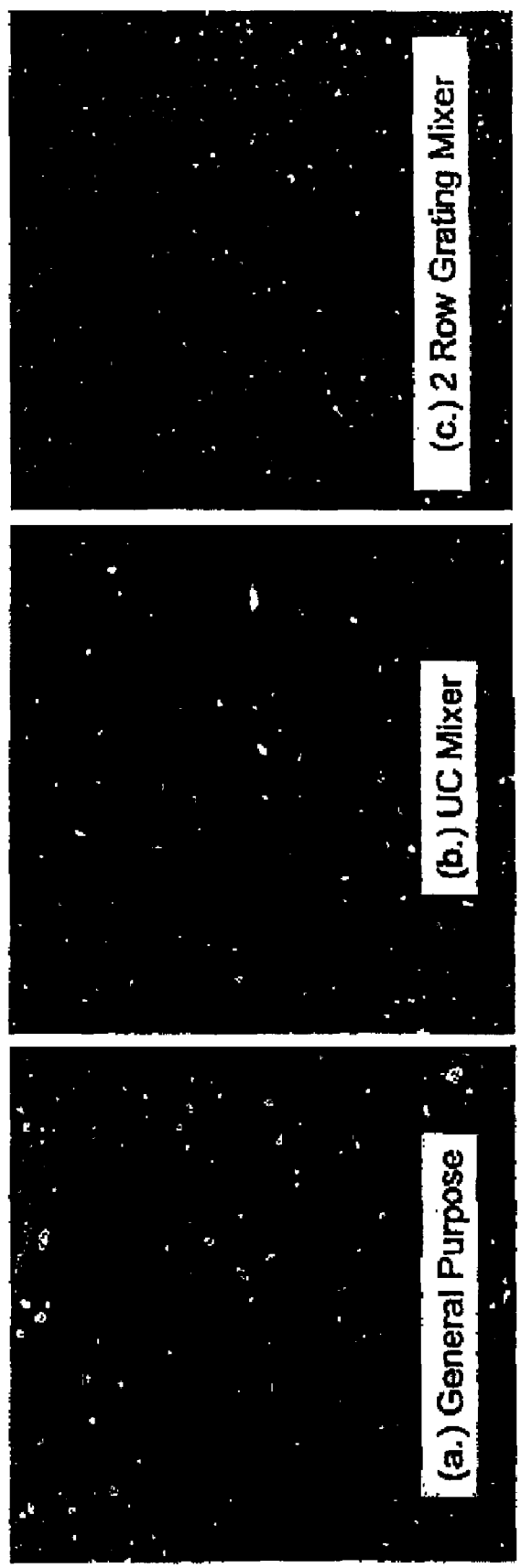
FIGS. 7a through 7c show scanned images extruded thermoplastic olefin resin including thermoset paint particles produced using (a) general purpose screw, (b) UC mixer, and (c) two row grating mixer consistent with the present invention.

Referring to FIGS. 7a through 7c, scanned images of representative films produced using the conventional metering screw, UC mixing section, and grated mixing section according to the experimental screw configurations are respectively shown. All images are at the same scale. The results are of paint flake size and distributions are also presented in Table 1, below. As can be seen from both the scanned images and the tabulated data, the average paint flake size obtained using the double row grating screw of the present invention is significantly smaller than those obtained using either the general purpose or LeRoy screws. The very largest paint flake length observed with the double row grating mixer was 47% smaller than that observed using the general purpose screw. The lower range value was also about 50% smaller. The physical size of the paint flakes is smaller, and as a result, there are more of flakes. Table 1 indicates that the smallest average particle length was generated with the double row grating screw.

Furthermore, it can be seen that there was little difference in paint flake size or size distribution for the films produced using the general purpose screw and LeRoy mixing section screw. The films produced using the general purpose screw and the LeRoy mixing section had wide paint flake length distributions, as indicated visually from the films, by the large standard deviation values, and by the very large range values. Some relatively large paint flake sizes were clearly visible for all of the films produced from melt that was plasticated with these screws.

Observed output, average melt temperature (using a preheated thermocouple melt probe), and motor current were recorded for each screw at 80 RPM from the above experimental examples is presented in Table 2. The outputs observed for each screw were essentially the same in each case. The addition of LeRoy mixer or double row grating mixer did not have a significant effect on output. However, they did have some effect on melt temperature and drive motor current. The bulk melt temperature for the LeRoy screw was 8° C. higher than that of the GP screw, a 3.5% increase. The bulk melt temperature for grating screw was 14° C. higher than that of the GP screw, a 6% increase. The increase in drive current reflects these melt temperature increases.

While, based on the increased melt temperature and shear history for the mixing screws, there was some concern that thermal or shear degradation could have taken place. However, an examination of melt index of re-pelletized material produced using each respective screw indicated no significant thermal or shear induced degradation associated with either of the two mixing sections as compared to the general purpose screw. The melt index testing was conducted on melt filtered samples to minimize paint flake interference. The average results (3 replicates) of the melt index test conducted at 190° C., 2.16 kg for the general purpose screw, LeRoy mixing section, and grated mixing section were 7.63 g/10 min., 7.57 g/10 min., and 7.63 g/10 min., respectively.

The physical property test results for injection molded samples produced using palletized extrudate from each of the three screw configurations, as well as virgin thermoplastic olefin control material are shown in Table 3. The test results indicate that ultimate elongation is the physical property most sensitive to particulate contamination. The extruded and molded virgin pellets had an ultimate elongation of 34% at a test rate of 50 mm/min. The (directly) molded TPO painted regrind had the lowest ultimate elongation value of 12%. When the painted regrind that was re-pelletized without the use of screens, the ultimate elongation values obtained were in the 20% range. The type of screw used for extrusion/pelletizing did not appear to be a significant factor. However, qualitatively, the appearance of the molded parts was visibly improved for the re-pelletized material produced with the grating screw based only on visual observation.

What is claimed is:

1. A plasticating screw including a root surface comprising:
   a flighted region at a proximal end of the screw;
   a mixing section adjacent a distal end of the screw, said mixing section comprising an inlet groove having a closed distal end, a discharge groove circumferentially spaced from said inlet groove, said discharge groove having a closed proximal end, and a grooved land region comprising at least one grating land element extending between said inlet groove and said discharge groove;
   wherein said inlet groove and said outlet groove include an axis;
   wherein said grating land element includes a plurality of openings and teeth oriented generally perpendicular to said axis of said inlet and said discharge grooves, wherein said openings do not extend to said root surface; and
   wherein said grooved land region has a diameter that generally corresponds to that of said flighted region.

2. A plasticating screw according to claim 1, wherein said mixing section comprises three sets of associated inlet grooves and discharge grooves separated by at least one grating element.

3. A plasticating groove according to claim 1 wherein each of the plurality of openings of the at least one grating land element have a width that is in the range of between about 0.002-0.200 inches and a depth that is in the range of between about 0.002-0.060 inches.

4. A plasticating screw according to claim 1 wherein each of the plurality of openings of the at least one grating land element have a width of about 0.032 inches and a depth of about 0.059 inches.

5. A mixing section for a flighted plasticating screw which includes a root surface, comprising an inlet groove having a closed distal end, a discharge groove circumferentially spaced from said inlet groove, said discharge groove having a closed proximal end, and a grooved land region comprising at least one grating land element extending between said inlet groove and said discharge groove;
   wherein said inlet groove and said outlet groove include an axis;
   wherein said grating land element includes a plurality of openings and teeth oriented generally perpendicular to said axis of said inlet and said discharge grooves, wherein said openings do not extend to said root surface; and
   wherein said grooved land region has a diameter that generally corresponds to that of the flighted region.

6. A mixing section for a plasticating screw according to claim 5, wherein said mixing section comprises three sets of associated inlet grooves and discharge grooves separated by at least one grating element.

7. A mixing section for a plasticating screw according to claim 5 wherein each of the plurality of openings of the at least one grating land element have a width that is in the range of between about 0.002-0.200 inches and a depth that is in the range of between about 0.002-0.060 inches.

8. A mixing section for a plasticating screw according to claim 5 wherein each of the plurality of openings of the at least one grating land element have a width about 0.032 inches and a depth of about 0.059 inches.

9. A method for mixing a primary thermoplastic material with a second material comprising:
   providing an extruder having a flighted screw which includes a root surface, comprising a mixing section including an inlet groove and a discharge groove having disposed therebetween a grooved land region comprising at least one grating land element extending between said inlet groove and said discharge groove wherein said grooved land region has a diameter that generally corresponds to that of the flighted region;
   wherein said inlet groove and said outlet groove include an axis;
   wherein said grating land element includes a plurality of openings and teeth oriented generally perpendicular to said axis of said inlet and said discharge grooves, and wherein said openings do not extend to said root surface;
   providing a combination of said primary material and said second material to said extruder and
   melt extruding the combination of said primary material and said second material using said extruder, whereby a domain size of said second material is reduced after melt extruding.

* * * * *